(12) United States Patent
Han

(10) Patent No.: US 7,315,878 B2
(45) Date of Patent: Jan. 1, 2008

(54) FAST FOURIER TRANSFORM DEVICE

(75) Inventor: Jung-Il Han, Goyang (KR)

(73) Assignee: LG Electronics, Inc., Seoul (KR)

( * ) Notice: Subject to any disclaimer, the term of this patent is extended or adjusted under 35 U.S.C. 154(b) by 784 days.

(21) Appl. No.: 10/665,600

(22) Filed: Sep. 22, 2003

(65) Prior Publication Data

US 2004/0071079 A1    Apr. 15, 2004

(30) Foreign Application Priority Data

Oct. 10, 2002    (KR) ............... 10-2002-0061908

(51) Int. Cl.
*G06F 17/14*    (2006.01)

(52) U.S. Cl. ................................... 708/404

(58) Field of Classification Search ............. 708/404
See application file for complete search history.

(56) References Cited

U.S. PATENT DOCUMENTS

| 5,890,098 | A | * | 3/1999 | Kozaki et al. ............... 702/77 |
| 6,263,356 | B1 | * | 7/2001 | Kozaki et al. ............... 708/400 |
| 6,356,926 | B1 | * | 3/2002 | Andre .......................... 708/404 |
| 6,938,064 | B1 | * | 8/2005 | Jalali et al. ................. 708/404 |
| 7,023,907 | B1 | * | 4/2006 | Olofsson et al. ............ 375/222 |
| 2002/0010817 | A1 | * | 1/2002 | Yeh ............................... 710/52 |
| 2003/0050945 | A1 | * | 3/2003 | Chen et al. ................... 708/404 |

* cited by examiner

*Primary Examiner*—Tan V. Mai
(74) *Attorney, Agent, or Firm*—Birch, Stewart, Kolasch, & Birch, LLP

(57) ABSTRACT

Dislosed is a fast Fourier transform device of a wireless LAN orthogonal frequency division multiplexing (OFDM) system. The device comprises: an FFT/IFFT unit constituted with one hardware, for performing a fast Fourier transform (FFT) and an inverse fast Fourier transform (IFFT); and a control signal input unit for outputting a control signal for controlling an operation of the FFT/IFFT unit.

11 Claims, 7 Drawing Sheets

FAST FOURIER TRANSFORM DEVICE

This nonprovisional application claims priority under 35 U.S.C. § 119(a) on Patent Application No(s). 10-2002-0061908 filed in KOREA on Oct. 10, 2002, which is(are) herein incorporated by reference.

BACKGROUND OF THE INVENTION

1. Field of the Invention

The present invention relates to a wireless LAN orthogonal frequency division multiplexing (OFDM) system, and more particularly, to a fast Fourier transform device of a wireless LAN OFDM system capable of performing a fast Fourier transform (FFT) and an inverse fast Fourier transform (IFFT).

2. Description of the Related Art

Nowadays, a wireless communication system enables a mobile multimedia service of a high quality by a continual technique development.

However, the wireless communication system transmits and receives data with a high speed, so that inter-symbol interference (ISI) is generated. According to this, in order to reduce said inter-symbol interference, an orthogonal frequency division multiplexing (OFDM), a modulation technique of the fourth generation is widely being used. The OFDM is performed for parallel data of a low speed, so that a fast equalization is not required, a usable bandwidth can be completely used, and a multi-path fading and impulse noise can be reduced.

The OFDM was mainly used in a military communication at the early days, and now it is widely being used in a digital video broadcasting for terrestrial (DVB-T), a wireless LAN, and etc. The DVB-T, a distant communication method, has a greater delay spread than a wireless LAN, a near communication method, so that a guard interval (GI), a region for preventing the delay spread has to become larger. Therefore, the DVB-T is realized as a fast Fourier transform (FFT) supporting both 2048 points and 8192 points.

On the other hand, the wireless LAN, a near communication method, has a less delay spread than the DVB-T, thereby being realized as an FFT for supporting 64 points.

FIG. 1 is a view showing a transmission block diagram of a general wireless LAN OFDM system;

As shown in FIG. 1, the wireless LAN OFDM transmission system comprises: a forward error control (FEC) coder 101 for performing a convolution encoding by receiving a signal generated from a media access control (MAC) layer; an interleaving/mapping unit 102 for performing an interleaving in order to prevent a burst error due to a fading of a signal outputted from the FEC coder 101 in a wireless section and performing a mapping so as to fit to a transmission speed of each signal; an inverse fast Fourier transform (IFFT) unit 103 for performing a multi carrier modulation (MCM) based on the mapped signal; a GI insertion unit 104 for inserting a GI to a signal outputted from the IFFT unit 103; a symbol wave shaping unit 105 for pulse-shaping filtering a signal outputted from the GI insertion unit 104; an IQ modulation unit 106 for modulating a signal outputted from the symbol wave shaping unit 105; a multiplier 107 for up-converting the modulated signal (converting into a wireless frequency signal); and a high power amplifier (HPA) 108 for amplifying the up-converted signal.

Transmission processes of the wireless LAN OFDM system will be explained in more detail as follows.

First, the FEC coder 101 receives a signal generated from a MAC layer thus to perform a convolution encoding, and thereby outputs. The interleaving/mapping unit 102 performs an interleaving in order to prevent a burst error of a signal outputted from the FEC coder 101, and performs a mapping so as to fit to a transmission speed of each signal by digital modulation methods such as a binary phase shift keying (BPSK), a quadrature phase shift keying (QPSK), 16 quadrature amplitude modulation (QAM), and 64 QAM.

The IFFT unit 103 performs an MCM which is a core technique of the OFDM on the basis of a signal mapped in the interleaving/mapping unit 102. Herein, the MCM converts serial data of a high speed into parallel data of a low speed and thus employs frequency division multiplexing (FDM), thereby transmitting the parallel data of a low speed without an influence of a multi-pass.

The GI insertion unit 104 inserts a GI corresponding to approximately a quarter of a length of an-FFT into a signal outputted from the IFFT unit 103. Also, the signal into which the GI is inserted is used in a synchronization algorithm such as a carrier recovery or a symbol timing recovery.

The symbol wave shaping unit 105 performs a pulse-shaping for the signal into which the GI is inserted in order to limit a transmission signal bandwidth of the signal, and the IQ modulation unit 106 modulates the pulse-shaped signal. The multiplier 107 outputs the modulated signal as a form which is finally up-converted into a bandwidth of 5.15~5.35 GHz and 5.725~5.825 GHz. Also, the high power amplifier (HPA) 108 amplifies the up-converted signal and transmits the amplified signal through an antenna.

FIG. 2 is a view showing a reception block diagram of a general wireless LAN OFDM system.

As shown in FIG. 2, the general wireless LAN OFDM reception system comprises: a low noise amplifier (LNA) 201 for minimizing noise generation of data received through an antenna and thus amplifying; a multiplier 202 for down-converting (converting into a middle frequency signal) the amplified data; an auto gain control (AGC) amplifier 203 for adjusting a gain of the down-converted signal; an IQ signal detector 204 for converting the signal of which gain was controlled into a baseband signal; an auto frequency control (AFC) clock recovery 205 for generating a clock to be used in the IQ signal detector; a GI removing unit 206 for removing a GI which has been inserted into a signal converted by the signal detector 204; an FFT unit 207 for performing a fast Fourier transform in order to convert the signal of which GI has been removed into a signal of a frequency region and thus generating a forward error correction (FEC) coded mapping sample; a demapping/deinterleaving unit 208 for deinterleaving and trellis-decoding the generated mapping sample; and an FEC decoder 209 for recovering a signal outputted from the demapping/deinterleaving unit 208 into data generated from the MAC of the transmission system and thus transmitting to an MAC of a receiving end.

As aforementioned, in case that a physical layer is formed in the wireless LAN OFDM system, the wireless LAN OFDM system has to constitute a hardware which performs the FFT/IFFT.

However, in the conventional wireless LAN OFDM system, the FFT/IFFT can not be shared in one hardware, thereby increasing a production cost and occupying much installation space.

SUMMARY OF THE INVENTION

Therefore, an object of the present invention is to provide a fast Fourier transform device capable of reducing a production cost by constituting an FFT unit and an IFFT unit as one hardware in a wireless LAN system.

Another object of the present invention is to provide a fast Fourier transform device capable of reducing an installation space of an FFT/IFFT processor by constituting an FFT unit and an IFFT unit as one hardware in a wireless LAN system.

To achieve these and other advantages and in accordance with the purpose of the present invention, as embodied and broadly described herein, there is provided a fast Fourier transform device comprising: an FFT/IFFT unit constituted as one hardware, for performing a fast Fourier transform (FFT) and an inverse fast Fourier transform (IFFT); and a control signal input unit for outputting a control signal for controlling an operation of the FFT/IFFT unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An FFT/IFFT unit of a wireless LAN OFDM system capable of realizing a transmission unit and a reception unit as one chip by constituting an FFT unit of a reception side and an IFFT unit of a transmission side as one hardware will be explained in more detail.

Figure 1:
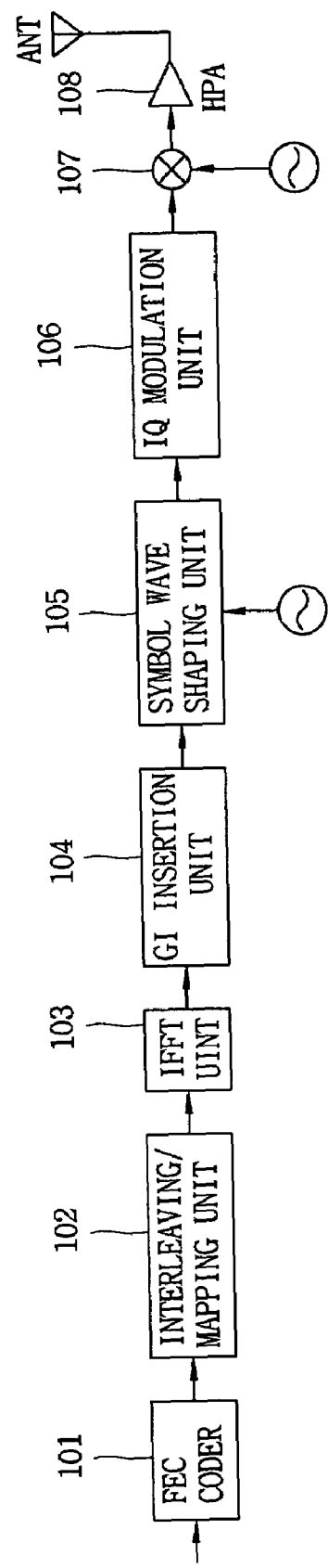
FIG. 1 is a view showing a transmission block diagram of a general wireless LAN OFDM system.
Figure 2:
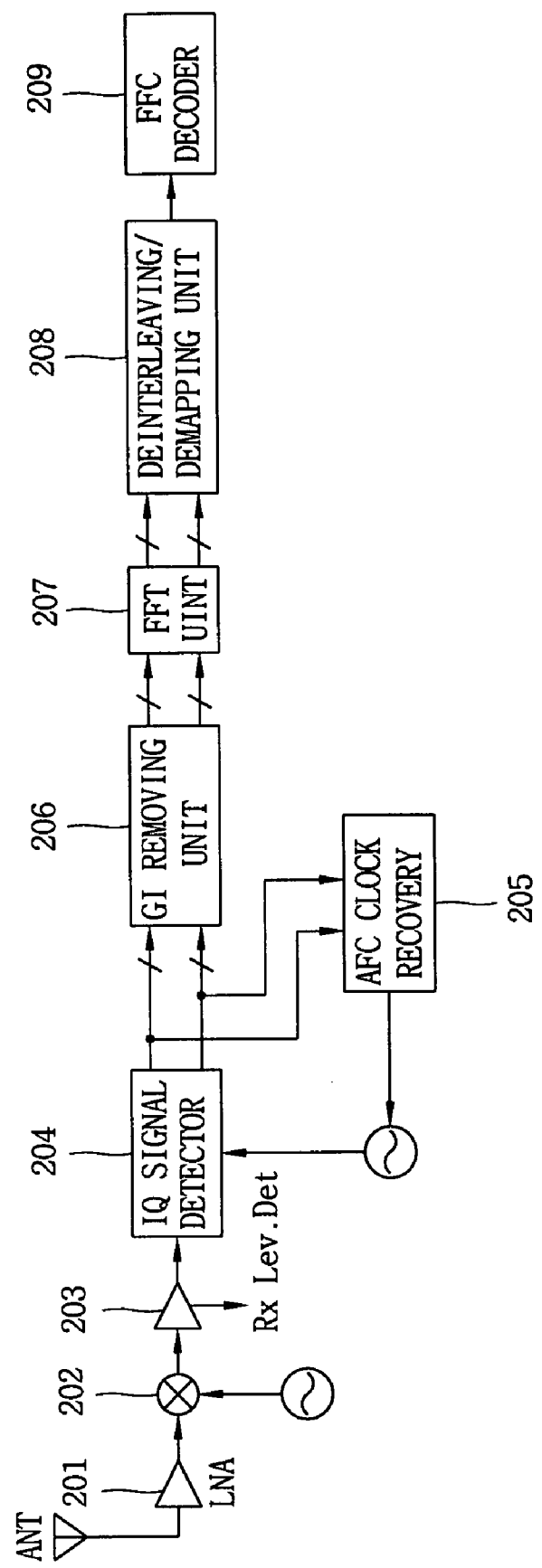
FIG. 2 is a view showing a reception block diagram of a general wireless LAN OFDM system.
Figure 3:
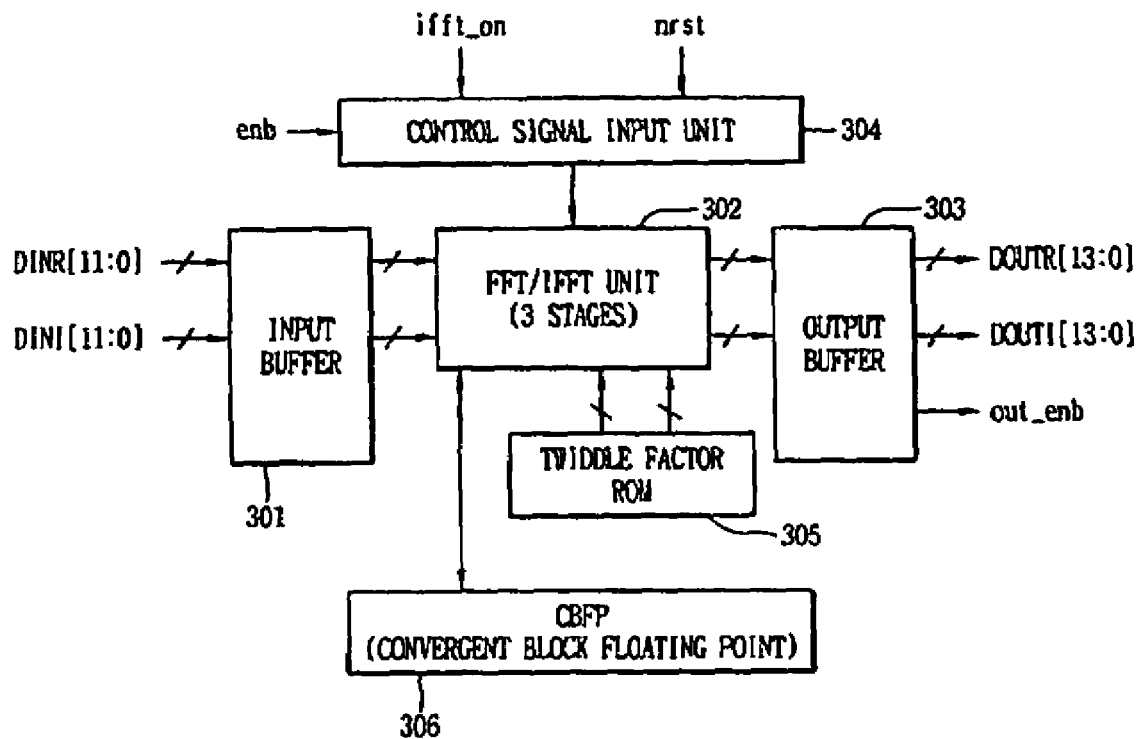
FIG. 3 is a block diagram showing a fast Fourier transform device according to the present invention.

FIG. 3 is a block diagram showing a fast Fourier transform device according to the present invention.

As shown in FIG. 3, the OFDM system according to the present invention comprises: an input buffer 301 for inputting a real signal and an imaginary signal of predetermined bits; an FFT/IFFT unit 302 for performing an FFT and an IFFT based on the inputted signal; an output buffer 303 for outputting a real signal and an imaginary signal outputted from the FFT/IFFT unit 302; a control signal input unit 304 for controlling an operation of the FFT/IFFT unit 302; a read only memory (ROM) 305 where twiddle factors provided to the FFT/IFFT unit 302 are stored as a table form; and a convergent block floating point (CBFP) 306 for compensating quantization noise generated from the FFT/IFFT unit 302.

Operations of the FFT/IFFT unit of the wireless LAN system according to the present invention will be explained as follows.

First, the input buffer 301 inputs a real signal of 12 bits (DINR[11:0]) and an imaginary signal of 12 bits (DINI[11:0]) to the FFT/IFFT unit 302. The FFT/IFFT unit 302 receives the real signal of 12 bits and the imaginary signal of 12 bits and thus performs an FFT or an IFFT according to transmission/reception functions, thereby outputting a real signal of 14 bits (DOUTR[13:0]) and an imaginary signal of 14 bits (DOUTI[13:0]) to the output buffer 303. The output buffer 303 outputs the real signal of 14 bits and the imaginary signal of 14 bits inputted from the FFT/IFFT unit 302 on the basis of an output signal denoting a start of a data output. Herein, the FFT/IFFT unit 302 has a pipelined structure for improving an operation speed of data and is constituted with three stages which performs an operation by a Radix-4 algorithm.

The control signal input unit 304 outputs control signals for controlling an operation of the FFT/IFFT unit 302, that is, a reset signal for initializing the FFT/IFFT unit (nrst), a mode determination signal for selecting the FFT/IFFT (ifft_on), and a starting signal denoting a start of inputted data (enb) to the FFT/IFFT unit 302. At this time, the ROM 305 stores twiddle factors required in the FFT/IFFT unit 302 as a table form. Also, the CBFP compensates for quantization noise generated during a data process of the FFT/IFFT unit 302. Operations of the FFT/IFFT unit of the wireless LAN OFDM system will be explained with reference to FIGS. 4 to 9.

First, a following formula 1 expresses a discrete Fourier transform (DFT). The DFT is used in converting a time domain signal into a frequency domain signal, and denotes a sub-carrier demodulation in the OFDM.

$$X(k) = \sum_{n=0}^{N-1} x(n) W_N^{nk} \text{ where, } n = 0, 1, \Lambda, N-1 \text{ with } W_N = e^{-j(2\pi/N)} \quad (1)$$

Herein, the n denotes a time index, the k denotes a frequency index, the N denotes a point, and the $W_N$ denotes a twiddle factor.

Also, a following formula 2 expresses an inverse discrete Fourier transform (IDFT). Contrary to the DFT, the IDFT is used in converting a frequency domain signal into a time domain signal, and denotes a sub-carrier modulation in the OFDM.

$$x(n) = \frac{1}{N} \sum_{k=0}^{N-1} X(k) W_N^{-nk} \text{ where,} \quad (2)$$

$$n = 0, 1, \Lambda, N-1 \text{ with } W_N = e^{-j(2\pi/N)}$$

When formulas such as said formulas 1 and 2 are realized as a substantial hardware, the realized hardware occupies much installation space and a continual speed of data is lowered. Accordingly, a hardware is realized by using an FFT algorithm which converts many parts of multiplication operations such as said formulas 1 and 2 into addition operations.

Methods for realizing a hardware on the basis of the FFT algorithm largely includes a method using RAM and a pipelined method. According to the method using RAM, twiddle factors and input data are stored in RAM and deleted thus to realize an FFT output, in which an installation space of a hardware is reduced.

Figure 4:
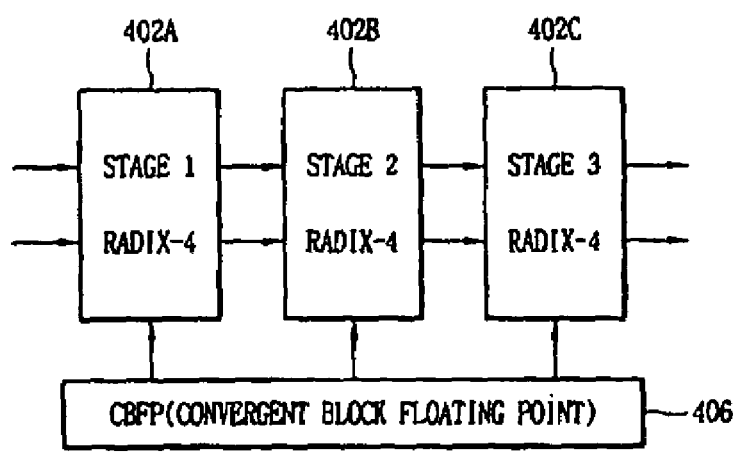
FIG. 4 is a detail block diagram of an FFT/IFFT unit according to the present invention.

However, since data process time is considerably delayed, an operation speed of data is lowered in the entire wireless LAN system and a bad influence occurs to a synchronization. Therefore, a predetermined point FFT according to the present invention (for example, 64 points FFT) was realized by a pipelined method which can reduce a hardware installation space than the DVB-T (2048/8192 points) and reduce data process time. Herein, the predetermined point FFT is preferably realized as a 64 points FFT FIG. 4 is a detail block diagram of the FFT/IFFT unit according to the present invention.

As shown, the FFT/IFFT unit is constituted with first, second, and third stages (402A, 402B, 402C) which perform an FFT/IFFT by a Radix-4 algorithm, and input data are compensated for quantum noise generated when data are processed on each stage by a CBFP 406. Herein, a construction and operations of said three stages will be explained with reference to FIG. 5.

Figure 5A:
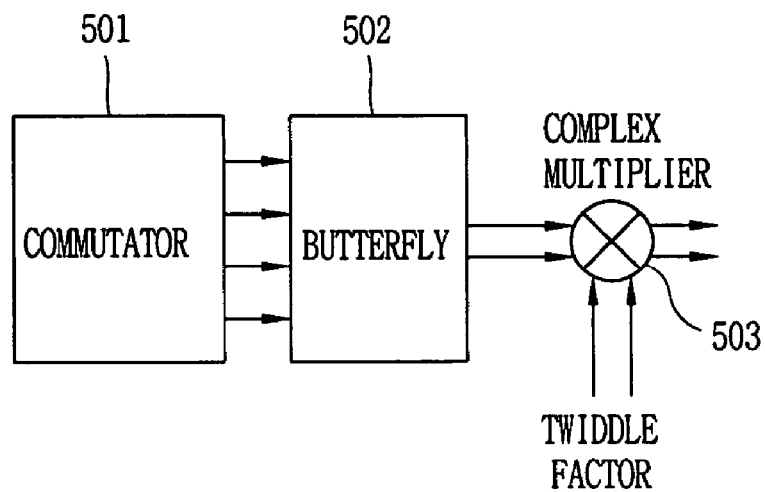
FIG. 5A is a detail block diagram of first and second stages of FIG. 4.
Figure 5B:
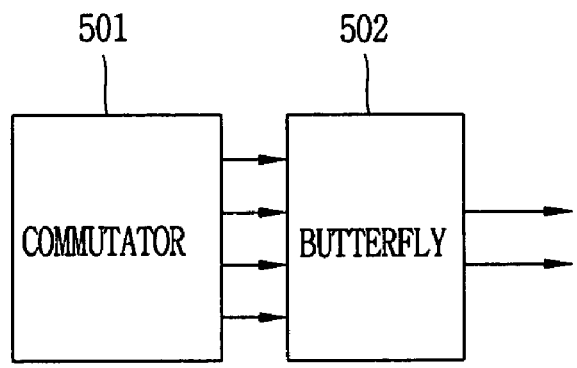
FIG. 5B is a detail block diagram of a third stage of FIG. 4.

FIG. 5A is a detail block diagram of the first and second stages of the FFT/IFFT unit of the present invention, and FIG. 5B is a detail block diagram of the third stage of the FFT/IFFT unit of the present invention.

As shown in FIG. 5A, the first and second stages comprise: a commutator 501 for aligning input data as a corresponding alignment method; a butterfly 502 for performing the Radix-4 butterfly operation based on data outputted from the commutator 501; and a complex multiplier 503 for multiplying data outputted from the butterfly 502 by twiddle factors inputted from a twiddle factor table of the ROM.

As shown in FIG. 5B, the third stage comprises: a commutator 501 for aligning input data as a corresponding alignment method; and a butterfly 502 for performing the Radix-4 butterfly operation based on data outputted from the commutator 501.

In said FFT/IFFT unit, when input data are processed in the first and second stages 302A and 302B, the input data are compensated for quantum noise from the CBFP 306 and then truncated. That is, in case that fixed data is a positive number, the CBFP 306 counts the number of '0' until '1' appears except the most significant bit (MSB). Also, in case that the fixed data is a negative number, the CBFP 306 counts the number of '1' until '0' appears except the MSB. Then, the CBFP 306 selects the smallest count value in each block of a certain data unit determined in the first and second stages, then left-shifts the input data as the smallest count value, and truncates.

Accordingly, the FFT/IFFT unit adds the value counted in the first and second stages 302A and 302B to data which have passed the third stage 302C, and sets all the output values to a certain number of digits on the basis of said obtained value. By this process, in the FFT/IFFT unit, the quantum noise is minimized and a signal noise ratio (SNR) more than 40 db is maintained.

Figure 6:
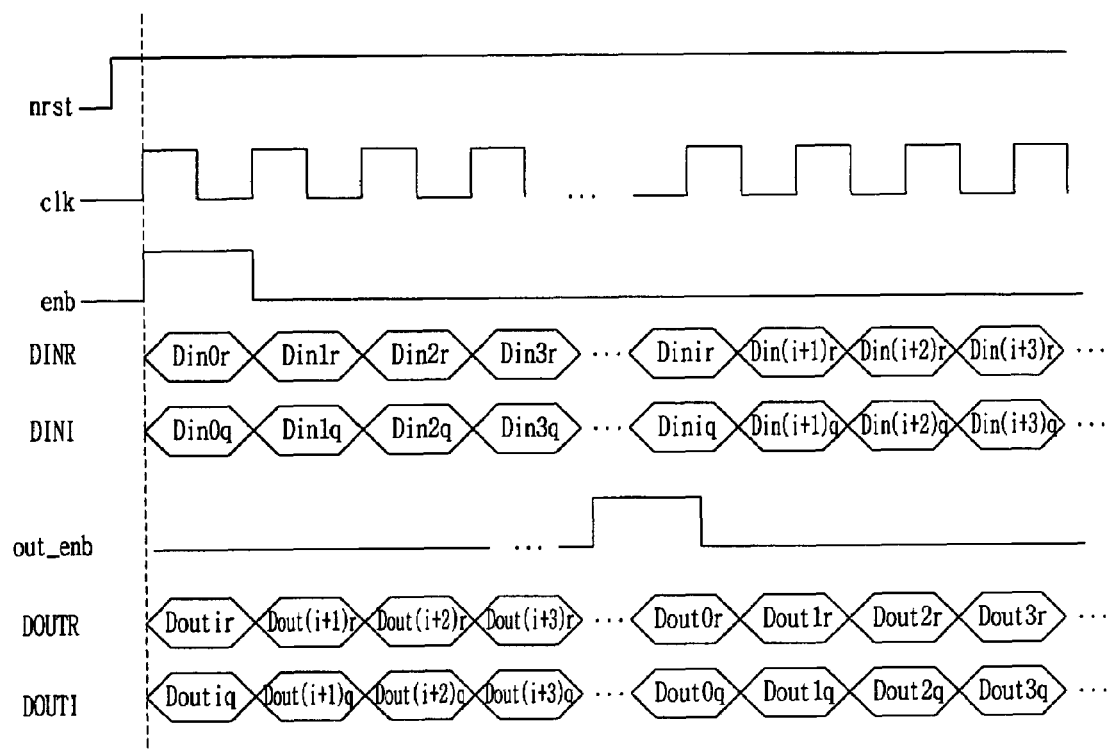
FIG. 6 is a timing view of input/output data according to the present invention.

FIG. 6 is a timing view of input/output data according to the present invention.

As shown, when a logical value of the input start signal (enb) is '1', it means a start of input data, and when a logical value of an output start signal (out_enb) is '1', it means a start of output data.

Figure 7A:
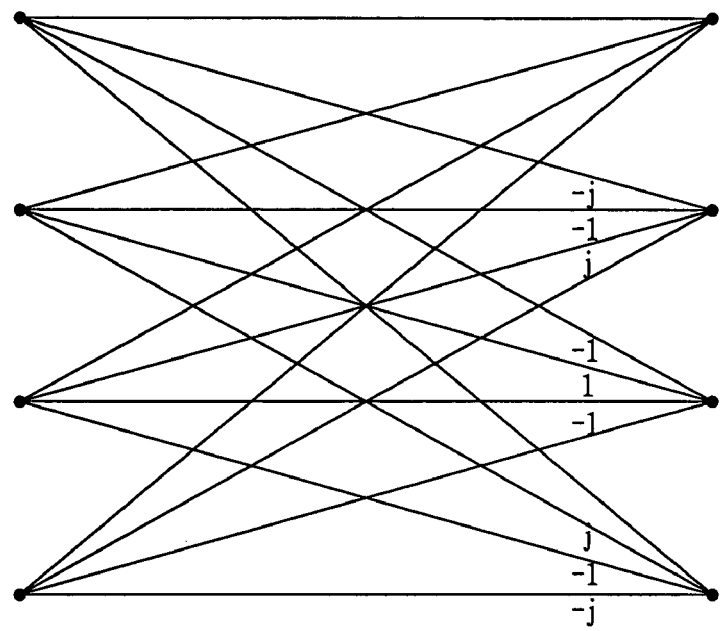
FIG. 7A is an explanatory view showing a structure of a Radix-4 FFT Butterfly according to the present invention.
Figure 7B:
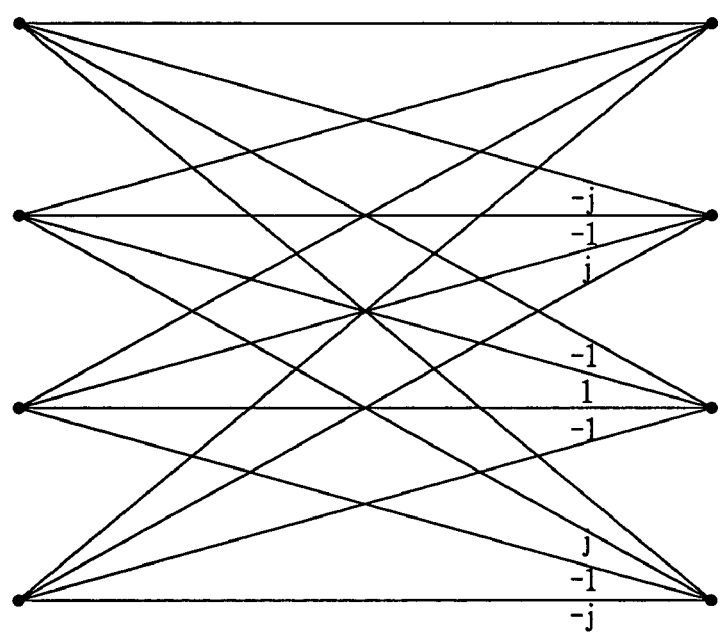
FIG. 7B is an explanatory view showing a structure of a Radix-4 IFFT Butterfly according to the present invention.

FIG. 7A is an explanatory view showing a structure of a Radix-4 FFT butterfly according to the present invention, and FIG. 7B is an explanatory view showing a structure of a Radix-4 IFFT butterfly according to the present invention.

As shown, an example of an FFT/IFFT butterfly operation in the Radix-4 structure is shown, in which the FFT operation and the IFFT operation have a different code in an imaginary part of a complex number. Accordingly, operation elements of the Radix-4 FFT/IFFT butterfly are constituted on the basis of said characteristic.

Figure 8A:
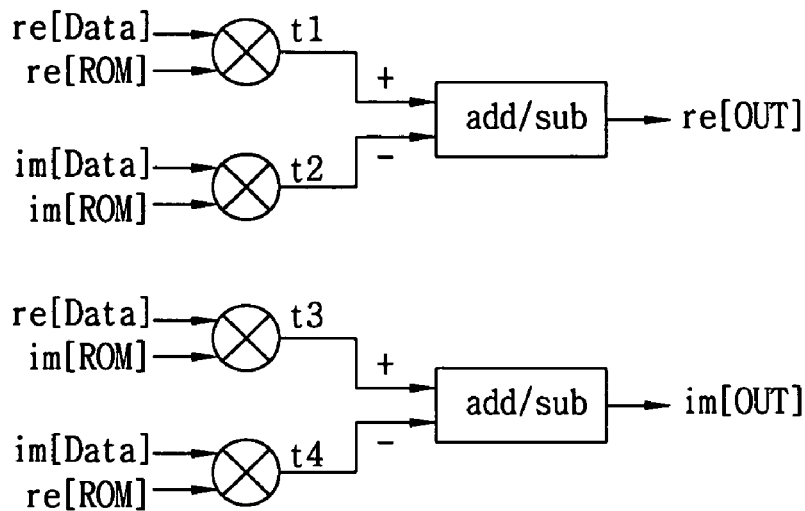
FIG. 8A is a detail view showing an input/output relation of an FFT complex multiplier according to the present invention.
Figure 8B:
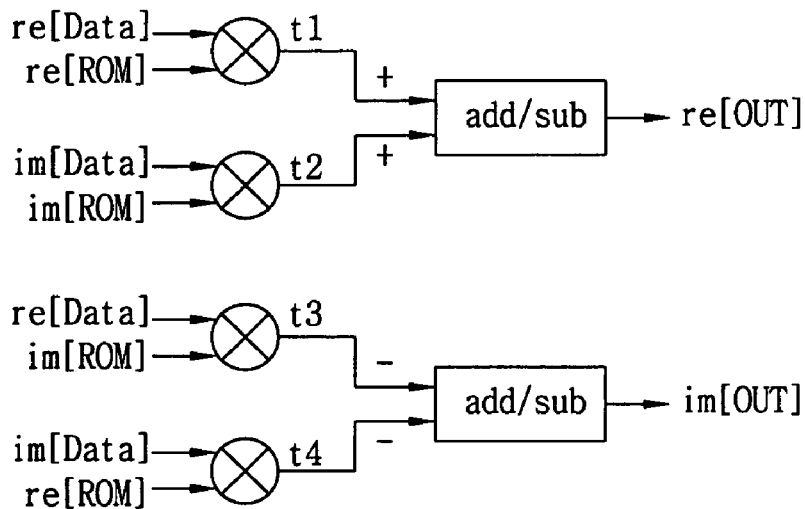
FIG. 8B is a detail view showing an input/output relation of an IFFT complex multiplier according to the present invention.

FIG. 8A is a detail view showing an input/output relation of an FFT complex multiplier according to the present invention, and FIG. 8B is a detail view showing an input/output relation of an IFFT complex multiplier according to the present invention.

FIGS. 8A and 8B shows a multiplication between the input data and twiddle factors, in which the twiddle factors are conjugates in the FFT/IFFT operation.

Accordingly, an operation between the FFT/IFFT butterfly and the complex multiplier can be controlled by using a mode determination signal of the control signal input unit. As the result, the FFT and the IFFT can be shared as one hardware.

As aforementioned, in the fast Fourier transform device of the wireless LAN system according to the present invention, a hardware which performs the FFT and the IFFT is constituted as one thus to reduce a production cost.

In the fast Fourier transform device of the present invention, a hardware which performs the FFT and the IFFT is constituted as one thus to reduce an installation space of IFFT/FFT processors.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A fast Fourier transform device and comprising:
an FFT/IFFT unit constituted with one hardware, for performing a fast Fourier transform (FFT) and an inverse fast Fourier transform (IFFT);
a control signal input unit for outputting a control signal for controlling an operation of the FFT/IFFT unit;
a convergent block floating point (CBFP) for compensating quantization noise generated from the FFT/IFFT unit; and
a read only memory (ROM) for storing twiddle factors used in the FFT/IFFT unit as a table form.

2. The device of claim 1, wherein the FFT/IFFT unit performs an IFFT at the time of transmitting a signal, and performs an FFT at the time of receiving the signal.

3. The device of claim 1, wherein the FFT/IFFT unit is realized by a pipelined method which enhances an operation speed of data.

4. The device of claim 1, wherein the control signal input unit outputs a reset signal for initializing the FFT/IFFT unit, an FFT/IFFT mode determination signal for determining the FFT/IFFT, and a start signal denoting a start of input data.

5. A fast Fourier transform device comprising:
- an FFT/IFFT unit constituted with first, second, and third stages respectively including a butterfly for performing a butterfly operation and a complex multiplier for multiplying data outputted from the butterfly by twiddle factors and thus outputting the multiplied value and for performing an FFT/IFFT;
- a control signal input unit for controlling an operation of the butterfly and the complex multiplier of the FFT/IFFT unit and thus outputting a control signal for performing the FFT or the IFFT to the FFT/IFFT unit;
- a convergent block floating point (CBFP) for compensating quantization noise generated from the FFT/IFFT unit; and
- a read only memory (ROM) for storing twiddle factors used in the FFT/IFFT unit as a table form.

6. The device of claim 5, wherein the first and second stages comprise:
- a commutator for aligning input data as a corresponding alignment method;
- a butterfly for performing a Radix-4 butterfly operation for data outputted from the commutator; and
- a complex multiplier for multiplying data outputted from the butterfly by twiddle factors and thus outputting.

7. The device of claim 5, wherein the third stage comprises:
- a commutator for aligning input data as a corresponding alignment method; and
- a butterfly for performing a Radix-4 butterfly operation for data outputted from the commutator.

8. The device of claim 5, wherein the FFT/IFFT unit performs an IFFT at the time of transmitting a signal, and performs an FFT at the time of receiving the signal.

9. The device of claim 5, wherein the FFT/IFFT unit is realized by a pipelined method which enhances an operation speed of data.

10. The device of claim 5, wherein the control signal input unit outputs a reset signal for initializing the FFT/IFFT unit, an FFT/IFFT mode determination signal for determining the FFT/IFFT, and a start signal denoting a start of input data.

11. A fast Fourier transform device comprising:
- an FFT/IFFT unit constituted with one hardware, for performing a fast Fourier transform (FFT) and an inverse fast Fourier transform (IFFT);
- a control signal input unit for outputting a control signal for controlling an operation of the FFT/IFFT unit; and
- a convergent block floating point (CBFP) for compensating quantization noise generated from the FFT/IFFT unit.

* * * * *